(12) United States Patent
Lu et al.

(10) Patent No.: US 7,688,526 B2
(45) Date of Patent: Mar. 30, 2010

(54) LIGHT-EMITTING DEVICES AND LENS THEREFOR

(75) Inventors: Ming Lu, Sijhih (TW); Lei Shi, Kowloon (CN); Chak Hau Pang, New Territories (CN)

(73) Assignee: Hong Kong Applied Science and Technology Research Institute Co. Ltd., Hong Kong Sar (CN)

( * ) Notice: Subject to any disclaimer, the term of this patent is extended or adjusted under 35 U.S.C. 154(b) by 302 days.

(21) Appl. No.: 11/654,601

(22) Filed: Jan. 18, 2007

(65) Prior Publication Data

US 2008/0174996 A1 Jul. 24, 2008

(51) Int. Cl.
- *G02B 17/00* (2006.01)
- *G02B 13/18* (2006.01)
- *G02B 3/00* (2006.01)
- *F21V 7/00* (2006.01)

(52) U.S. Cl. .................. 359/727; 359/708; 362/346
(58) Field of Classification Search .................. 359/708, 359/712, 718, 721, 727; 362/335, 346, 347, 362/231, 240, 241

See application file for complete search history.

(56) References Cited

U.S. PATENT DOCUMENTS

| 6,598,998 B2 | 7/2003 | West et al. |
| 2002/0191395 A1 * | 12/2002 | Fleury .................. 362/240 |
| 2003/0202349 A1 | 10/2003 | Suehiro et al. |
| 2005/0243576 A1 | 11/2005 | Park et al. |
| 2005/0264716 A1 | 12/2005 | Kim et al. |
| 2006/0034097 A1 | 2/2006 | Hahm et al. |
| 2006/0126353 A1 | 6/2006 | Ishida |
| 2007/0171665 A1 * | 7/2007 | Finch .................. 362/516 |

FOREIGN PATENT DOCUMENTS

| CN | 1591914 | 3/2005 |
| CN | 1702507 | 11/2005 |
| JP | 2001-076511 | 3/2001 |
| JP | 2001-101913 | 4/2001 |
| JP | 2002-111071 | 4/2002 |
| JP | 2005-190859 | 7/2005 |

OTHER PUBLICATIONS

International Search Report Application No. PCT/CN2007/003466 dated Mar. 27, 2008.

* cited by examiner

*Primary Examiner*—Alicia M Harrington
(74) *Attorney, Agent, or Firm*—Buchanan Ingersoll & Rooney PC

(57) ABSTRACT

A light-emitting assembly comprising a lens, a first optical source, a second optical source and a third optical source, wherein the lens is disposed forward of said first, second and third optical sources; the third optical source is intermediate the first and second optical sources; and the lens and the first, second and third optical sources are arranged so that light emitted from the first and second optical sources merges at the third optical source after undergoing internal reflection at the lens.

22 Claims, 11 Drawing Sheets

LIGHT-EMITTING DEVICES AND LENS THEREFOR

FIELD OF THE INVENTION

The present invention relates to light-emitting devices, and more particularly, to light-emitting devices comprising a lens for conditioning light output of a plurality of light-emitting sources for forward transmission. More specifically, although not solely limited thereto, the present invention relates to a lens for conditioning the optical output of a plurality of light-emitting sources for display applications, light-emitting assemblies comprising such a lens and a display comprising such light-emitting assemblies.

BACKGROUND OF THE INVENTION

Many light-emitting sources have light intensity distribution characteristics which are more conveniently depicted by a graph showing a variation of light intensity with reference to radial angles in lateral directions, as described for example in US 2006-0034097A1.

Semiconductor light-emitting devices are finding increasingly more applications in modern day electronic devices. Typical semiconductor light-emitting sources, for example, packaged light-emitting diodes (LED), are directional and have a characteristic optical axis along which light is propagated. Typically, the light intensity of an LED follows the Lambert distribution as depicted in FIG. 27 of US 2006-0034097A1. More particularly, a substantial portion of the entire light energy emitted by an LED is contained within an angular range centred about the optical axis and the angular range is commonly referred to as the "viewing angle" of an LED. The viewing angle ranges of an LED are typically between +/−15° to +/−60° about the optical axis.

In many applications involving the use of semiconductor light-emitting devices, it is desirable to condition the optical output of a plurality of light-emitting sources to suit various objectives.

For example, a liquid crystal display (LCD) is generally equipped with a backlight apparatus comprising an array of LEDs for illuminating an LCD panel from behind, since an LCD display panel is not self-illuminating. An example of such a backlight apparatus is described in US 2005-0243576A1.

In such or other similar applications, it is desirable to mix optical output from a plurality of LEDs, for example, LEDs of the three primary colours, red (R), green (G) and blue (B), to prepare for forward transmission. The mixing of light from a plurality of LEDs, for example, LEDs emitting the three primary colours is advantageous since, by separating the LEDs into a plurality of distributed locations, and then by mixing light from the plurality of distributed sources, problems associated with the high power dissipation and the consequential thermal loading of a high power discrete white LED can be alleviated. However, the typical distribution characteristics of a typical LED means that a relatively large distance, compared to the length of a display panel, is required for light mixing. Therefore, it will be highly desirable if there can be provided optical arrangements for reducing the light mixing distance between a plurality of LED.

An exemplary optical arrangement for conditioning outputs of an LED for forward transmission is described in U.S. Pat. No. 6,598,998. However, such an arrangement requires a double molding process. Another example of such an optical arrangement is described in US 2006-0034097A1. The lens of US 2006-0034097A1 has a relatively complicated structure and the light mixing distance is relatively long.

Therefore, it will be desirable if there can be provided lens and light-emitting assemblies which would mitigate shortcomings of the known art.

SUMMARY OF THE INVENTION

According to the present invention, there is provided a light-emitting assembly comprising a lens, a first optical source, a second optical source and a third optical source, wherein said lens is disposed forward of said first, second and third optical sources; said third optical source is intermediate said first and second optical sources; and said lens and said first, second and third optical sources are arranged so that light emitted from said first and second optical sources merges at said third optical source after undergoing internal reflection at said lens and said light is forwardly transmitted after mixing with light of said third optical source.

With an optical assembly of this invention, the optical outputs of a plurality of light-emitting sources can be adequately mixed within a relatively short distance from the sources for forward transmission.

In a preferred example, said lens comprises a first concave portion and a second concave portion, said first concave portion is configured for reflecting light from said first optical source back towards said third optical source, and said second concave portion is configured for reflecting light from said second optical source back towards said third optical source.

By aligning the first and second light-emitting sources with their corresponding concave surfaces so that the reflected beams meet at the third light-emitting source, light mixing between adjacent plurality of light-emitting sources can be adequately performed within a shorter distance.

As an example, said first concave portion may be part of a first ellipse, and said first and third optical sources may be located at the foci of said first ellipse.

In addition, said second concave portion may form part of a second ellipse, and said second and third optical sources may be located at the foci of said second ellipse.

With this configuration, said first and second ellipses intersect, and said third optical source is located at a common foci of both said first and second ellipses.

More particularly, said first and second ellipses intersect at a location directly forward of said third optical source.

As an example, said first and second ellipses may be identical.

In a convenient example, the major axes of said first and said second ellipses may be collinear, and said first, second and third optical sources are located on the major axes of said first and second ellipses.

Preferably, said first, second and third optical sources may be distributed at foci of said ellipses.

Advantageously, the ratio between the major and the minor axes of each one of said ellipses is larger than 1 and smaller than 1.25.

Advantageously, said first optical source may be arranged so that light emitting from said first optical source impinges said lens at an angle exceeding the critical angle and is then reflected towards said third optical source, said second optical source is arranged so that light emitting from said second optical source impinges said lens at an angle exceeding the critical angle and is then reflected towards said third optical source, and said third optical source may be arranged for emitting light forward of said lens.

To accommodate a plurality of peripheral LEDs, said lens may form a portion of an ellipsoid, and said first, and said second and said third optical sources may be distributed on a focal plane, and said focal plane orthogonally intersects the major axis of said ellipsoid and contains foci of said ellipsoid.

For backlighting of an LCD panel, said first, said second and said third optical sources may be LEDs.

Preferably, said first, said second and said third optical sources may be of different colours.

Advantageously, said first, said second and said third optical sources may emit red light, green light, or blue light.

According to another aspect of this invention, there is provided a plurality of optical assemblies as described herein and arranged in an array.

According to a further aspect of this invention, there is provided a lens for conditioning optical output from at least first, second and third light-emitting sources for forward light transmission comprising a first concave portion and a second concave portion, wherein said first concave portion is configured to reflect light emitted by said first light-emitting source towards a third light-emitting source, said second concave portion is configured to reflect light emitted by said second light-emitting source towards said third light-emitting source, and said lens is configured to allow forward passage of light emitted from said third light-emitting source.

In a convenient example, said first concave portion may form part of a first ellipse, said second concave portion forms part of a second ellipse, and said first and second ellipses share a common focal point.

For example, the major axes of said first and second ellipses may be collinear.

For easy molding, the forward facing portion of said lens may be convex.

In another convenient example, said first and said second ellipses may be identical, and said first and second concave portions of said lens are both formed by revolution of said first or second ellipse about an axis orthogonal to the major axes of said ellipses.

Advantageously, said first concave portion may be part of a hollow ellipsoid and said second concave portion may form part of a second hollow ellipsoid, and said first and second hollow ellipsoids share a common focal point.

More particularly, the major axes of said first and second hollow ellipsoids may be collinear and said first and second hollow ellipsoids may share a common axis which intersects the common focal point and the major axes of the ellipses.

As a convenient example, said first and second hollow ellipsoids may be identical.

In an advantageous example, said first and second concave portions intersect on an intersection plane, and said intersection plane may be orthogonal to the major axes of said ellipses and contains a common foci of said first and second ellipses.

Preferably, said first concave portion and said first light-emitting source, and said second concave portion and said second light-emitting source may be arranged so that light emitted from said first and said second light-emitting sources will incident said first and second concave portions respectively at the critical angle or above such that light is reflected to said third light-emitting source by total internal reflection.

According to yet another aspect of this invention, there is provided a lens for mixing light from a plurality of peripheral light-emitting sources with a central light-emitting source for forward transmission comprising a plurality of concave portions, wherein each said concave portion forms part of a hollow ellipsoid with said central optical source for positioning at a common foci, and said plurality of peripheral light-emitting sources are distributed at other foci locations of the plurality of hollow ellipsoids forming said plurality of concave portions.

Advantageously, the major axes of said plurality of ellipsoids may lie on a common plane, and said common foci is surrounded by said other foci locations.

BRIEF DESCRIPTION OF THE DRAWINGS

Preferred embodiments of the present invention will be explained in further detail below by way of examples and with reference to the accompanying drawings, in which:—

DETAILED DESCRIPTION OF THE PREFERRED EMBODIMENTS

Figure 1:
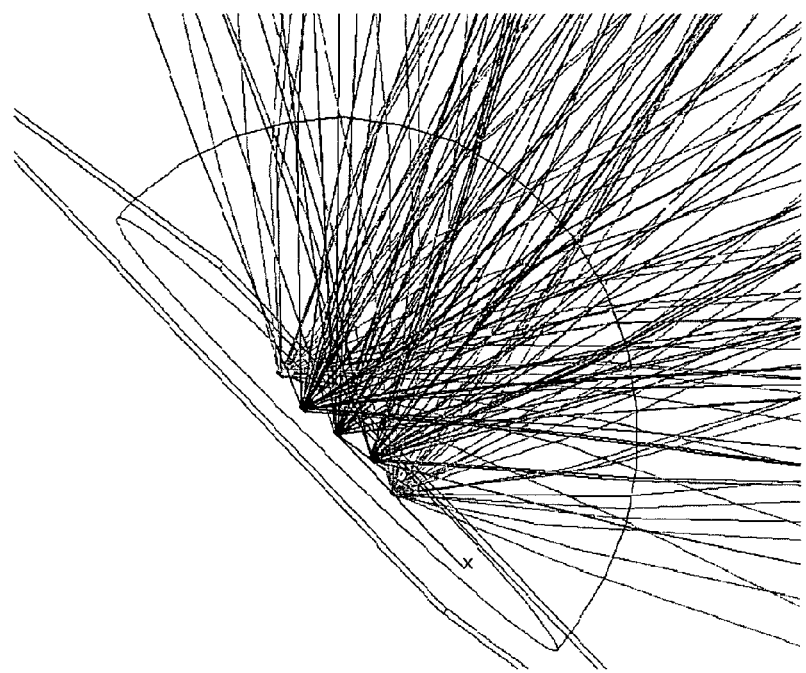
FIG. 1 is a light ray diagram illustrating in schematics optical output from a plurality of LEDs disposed at a plurality of adjacent positions.
Figure 1A:
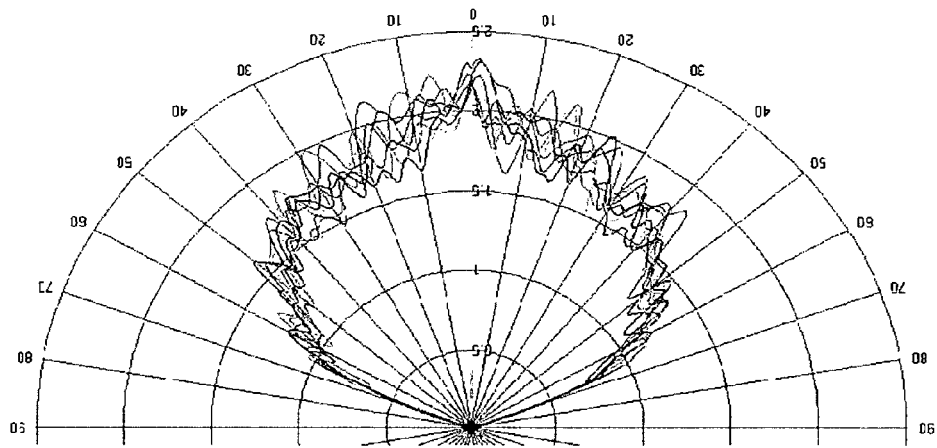
FIG. 1a illustrates the characteristic light intensity distribution of the light-emitting sources of FIG. 1.
Figure 2:
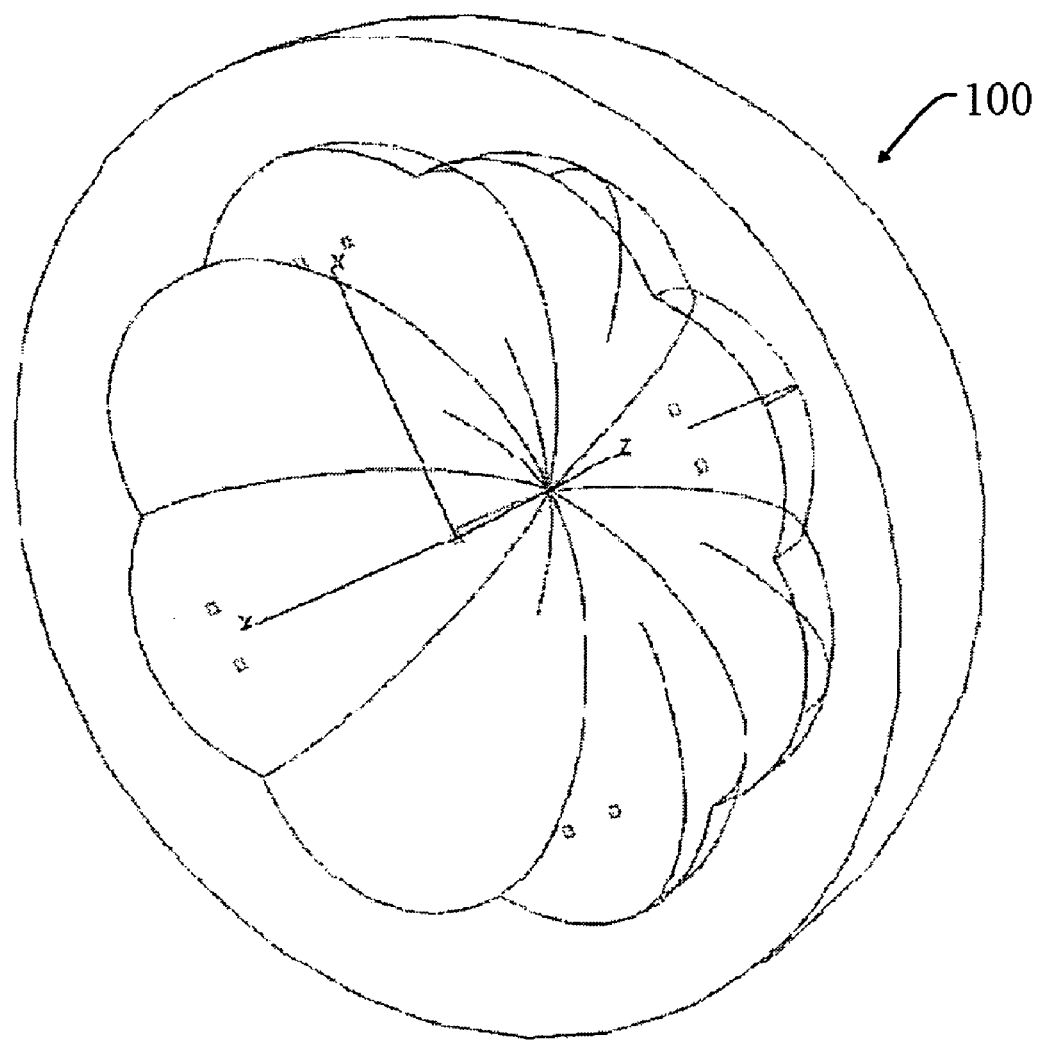
FIG. 2 is a forward perspective view of a light-emitting assembly depicting a first preferred embodiment of this invention.
Figure 3:
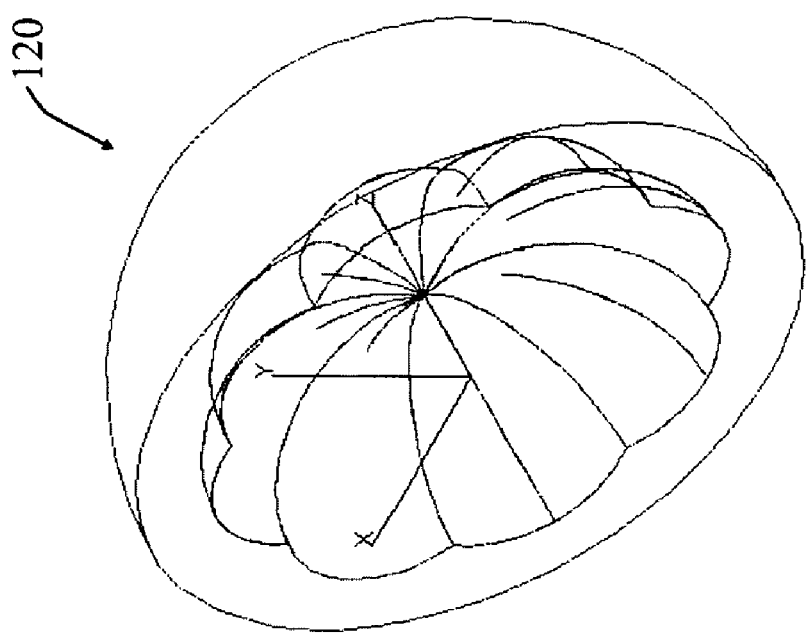
FIG. 3 is a front perspective view from behind of lens of FIG. 2.

In FIG. 1, there is shown a light-emitting assembly comprising a plurality of distributed LEDs with substantially parallel optical axes. As can be seen from the light intensity distribution diagram of FIG. 1a, the bulk of the light energy is contained within a viewing angle of about 140° with the light intensity concentrated about the optical axes. In such an arrangement, the light mixing distance is relatively large and is determined by the viewing angles.

Figure 5:
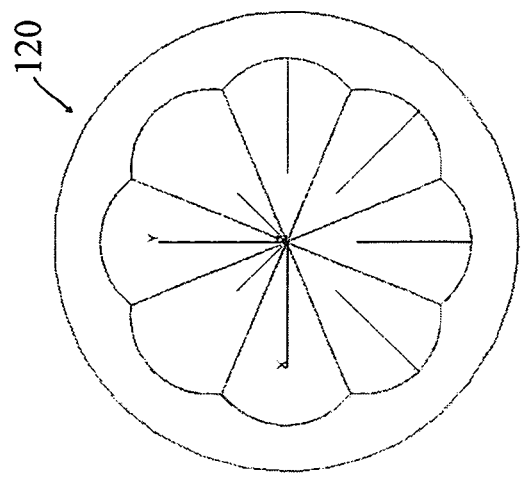
FIG. 5 is a top plan view of the lens of FIG. 2.
Figure 4:
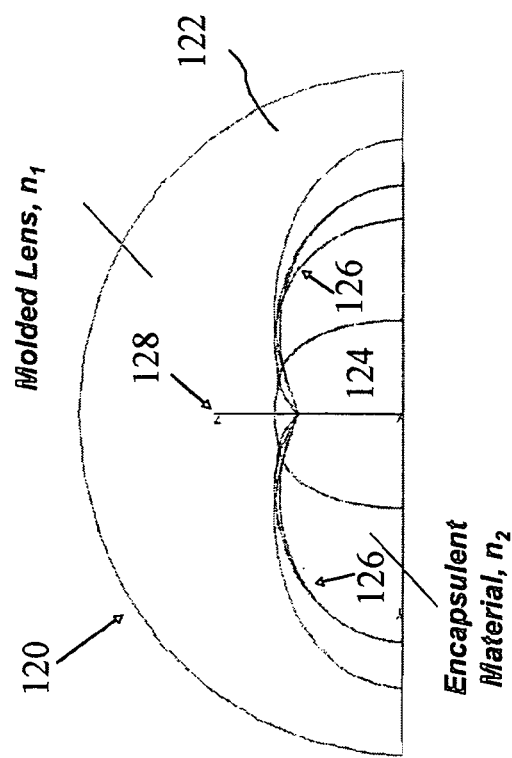
FIG. 4 is a side elevation view of a lens of the light-emitting assembly of FIG. 2.
Figure 6:
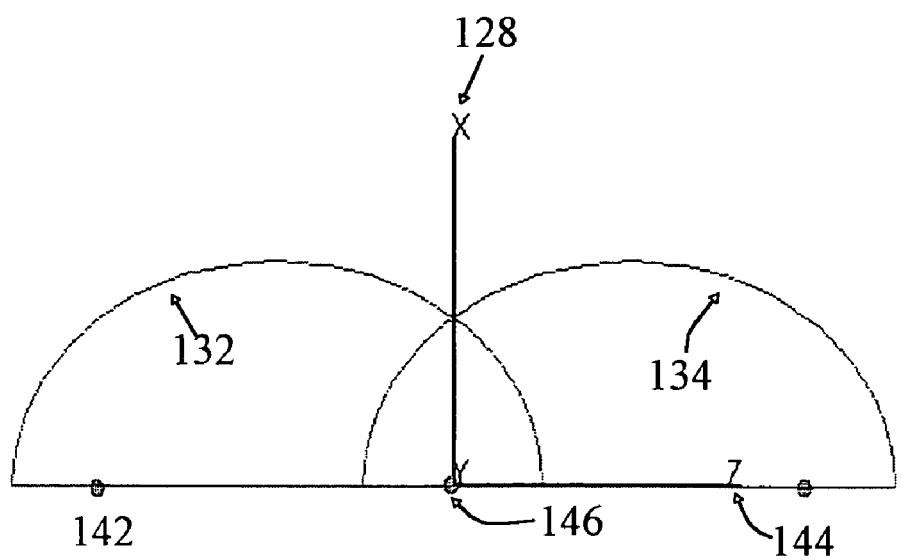
FIG. 6 is a schematic diagram illustrating the relative disposition of three LEDs disposed within a hollow light-mixing compartment across a transversal section of the lens of FIG. 4.

In a first preferred embodiment of this invention as depicted in FIGS. 2 to 8, the light-emitting assembly 100 comprises a lens 120 and a plurality of LEDs, which are used a convenient example of a semiconductor light-emitting source. The lens comprises a lens body 122 and a light-mixing compartment 124 which is defined by a lens body. The light-mixing compartment is defined by a plurality of concave portions 126 which are distributed about a central axis 128 as more particularly depicted in FIG. 3. In the lens depicted in FIG. 2, the light-mixing compartment comprises a plurality of concave portions and each concave portion forms part of an ellipsoid. In this specific example, the plurality of concave portions is formed by intersection of eight partial ellipsoids as more particularly shown in FIGS. 2 to 4. The eight concave portions of FIGS. 2 to 5 are arranged into four diametrically opposite concave portion pairs and each of the diametrically opposite concave portion pair has a typical cross-section across the central axis as shown in FIG. 6.

Referring to FIG. 6, the pair of diametrically opposite concave portions is defined by first 132 and second 134 partial ellipses, which share a common focal point 146 to take advantage of the property of an ellipse that light rays from one focus of an ellipse will reflect to the other focus. The major axes of the first and second partial ellipses are collinear, with the central axis 128 of the double-concave light mixing compartment 124 orthogonal to the major axes and intersecting the common focal point. The space underneath the first and second ellipses defines a light-mixing compartment to be explained below with reference to FIGS. 7 and 8.

Figure 7:
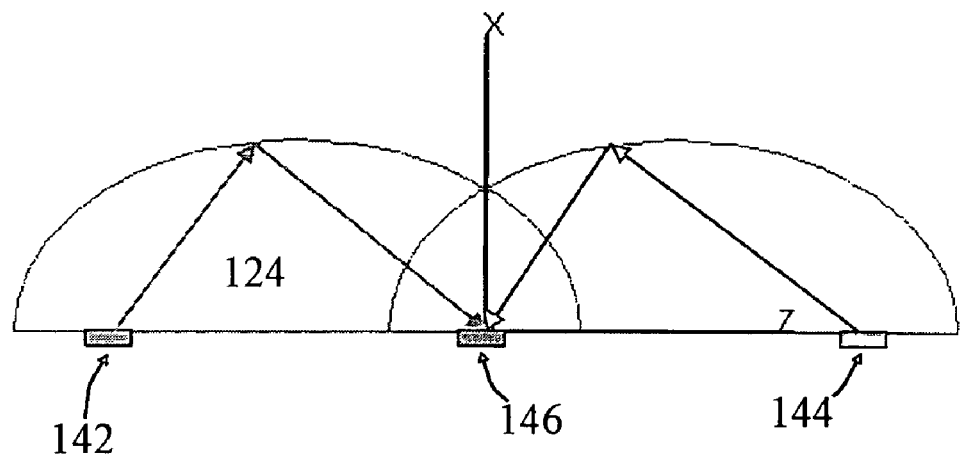
FIG. 7 illustrates in schematics exemplary optical ray paths from a pair of laterally disposed LEDs towards a centrally placed LED.

Referring to FIG. 7, three LEDs are disposed along the collinear major axes of the first and second ellipses:—a first LED 142 disposed at a focus of the first ellipse which is distal from the second ellipse, a second LED 144 disposed at a focus of the second ellipse which is distal from the first ellipse, and a third LED 146 disposed at a common focus of the first and second ellipses. In this arrangement, the first, second and third light sources are collinear. In addition, where the first and second ellipses are identical, the first, second and third light sources are also, but not essentially, equally spaced apart. As shown in FIG. 5, the common focus is intermediate the non-common foci of the first and second ellipses. In order to facilitate light mixing within the light-mixing compartment 124, the first light-emitting source is configured so that its optical axis is aligned towards the ceiling of the light-mixing compartment defined by the first ellipse 132 and such that the light emitted by the first light-emitting source is incident upon the ceiling of the light-mixing compartment at an angle so that the emergent beam will be forwarded towards the common focus. Likewise, the second light-emitting source is configured so that light emitting along the optical axis of the second LED will impinge the ceiling of the light-mixing compartment defined by the second ellipse and the resultant emergent beam will also travel towards the common focus to combine with the optical output of the third light-emitting source located at the common focus. After the optical outputs from the first and second light-emitting sources have been combined at the third light-emitting source, the combined resultant beam will be transmitted forwardly away from the third light-emitting source and through the lens, for example, by reflector of the third LED. Since the optical output from the light-emitting assembly is a light combining all the three optical outputs from the three light-emitting sources, if each of the first, second and third light-emitting sources generates one of the three primary colours, namely, red, green and blue, the resulting light emission from the light-emitting assembly will be a white light. Of course, other appropriate coloured light-emitting sources can be appropriately arranged and disposed to generate other coloured light to suit objectives of individual applications.

Figure 8:
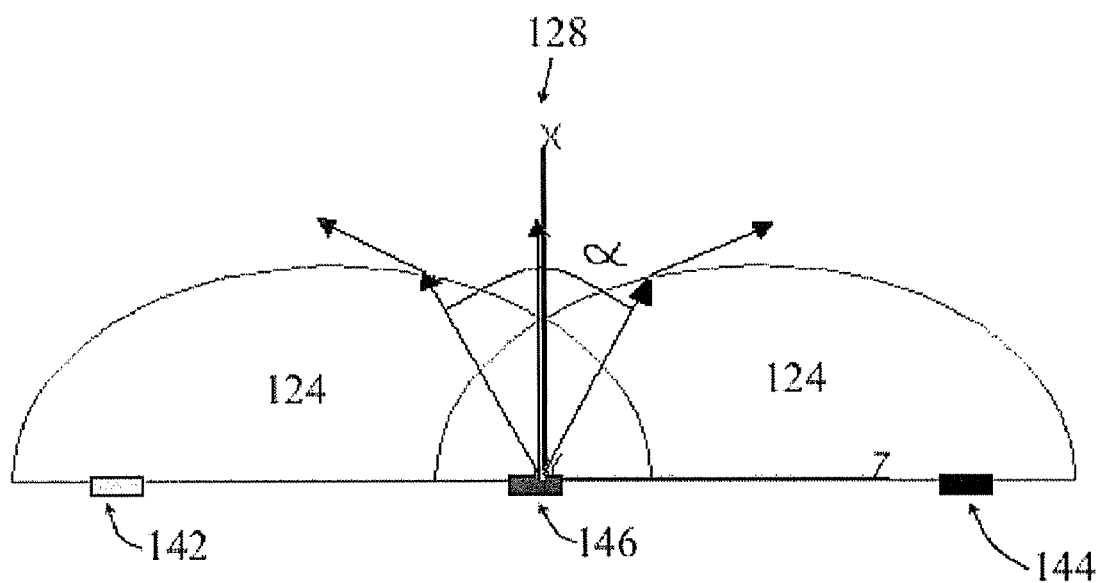
FIG. 8 is a schematic optical ray diagram illustrating forwardly transmitted optical beams from the centrally positioned LED device.

Due to a tapered intersection between the first and second ellipses and opposite the third light source so that the intersecting portion of the first and second ellipse is flared outwardly, light emerging from the third light source will be spread and emerge with enlarged emission angels, as shown in FIG. 8. In this embodiment, it will be noted that the first, second and third light sources are equally spaced apart.

In this specific example, the lens is moulded from a transparent material with a hemispherical exterior, for example, PMMA, having a refractive index exceeding 1. By configuring the curvature of the first and second ellipses and by aligning the optical axis to incident upon the ellipses at or above the critical angle, light will be reflected towards the common focus at which the third light-emitting source is located.

Figures 9A, 9B, 9C:
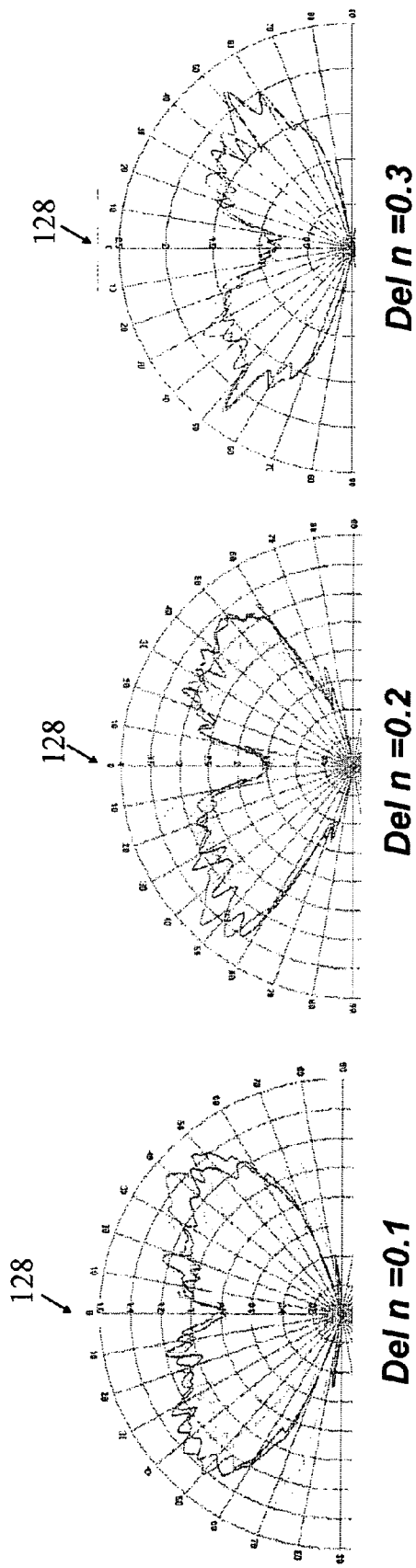
FIGS. 9A-9C are exemplary light intensity distribution diagrams corresponding to $\delta n=0.1=0.2=0.3$ respectively of the lens of FIG. 2.
Figure 11:
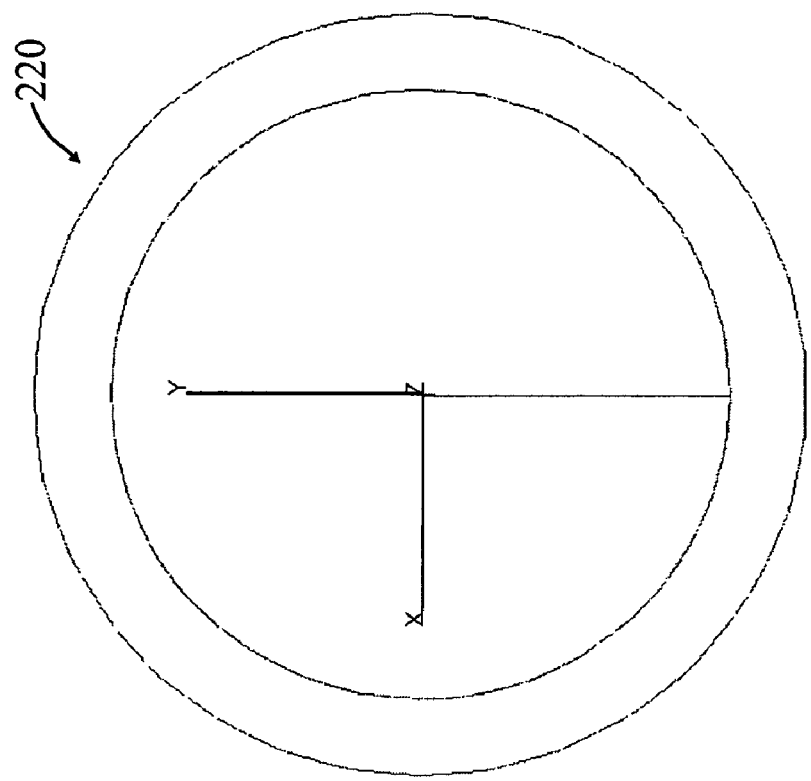
FIG. 11 shows a top plan view of the lens of FIG. 10.
Figure 10:
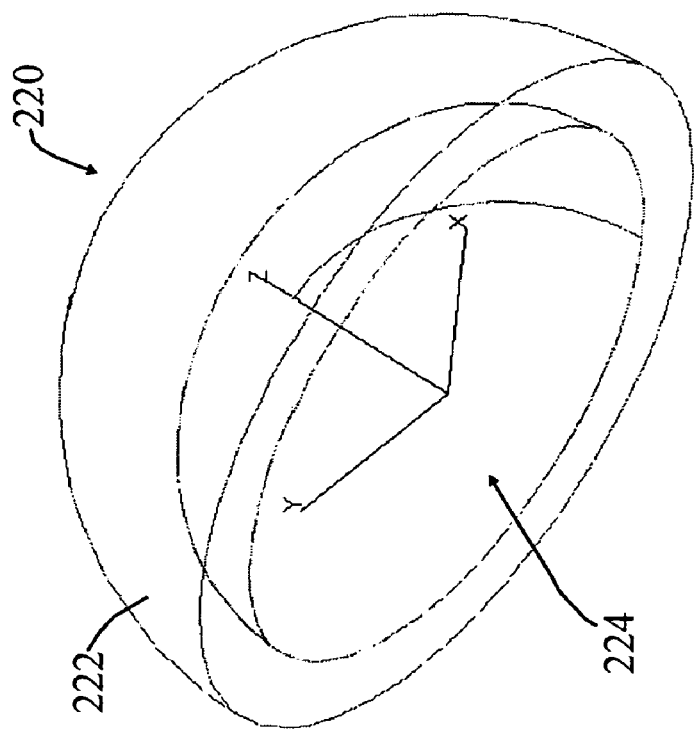
FIG. 10 is a perspective view of a lens illustrating a second preferred embodiment of this invention.

FIGS. 9A, 9B and 9C show exemplary light intensity distribution diagrams of the light-emitting assembly of FIG. 8 with $\delta n=0.1$, 0.2 and 0.3 respectively, where $\delta n$ means the differences in refractive index between the transparent media in the lens body and the light-mixing compartment. Although the space inside the light-mixing compartment can be air with a refractive index of 1 due to Fresnel reflection, the light-mixing compartment is filled with a filler with a refractive index higher than that of the lens material so as to obtain an appropriate difference in the refractive index to cause total internal reflection at interface between the light-mixing compartment and the lens body for appropriate applications.

Figure 12:
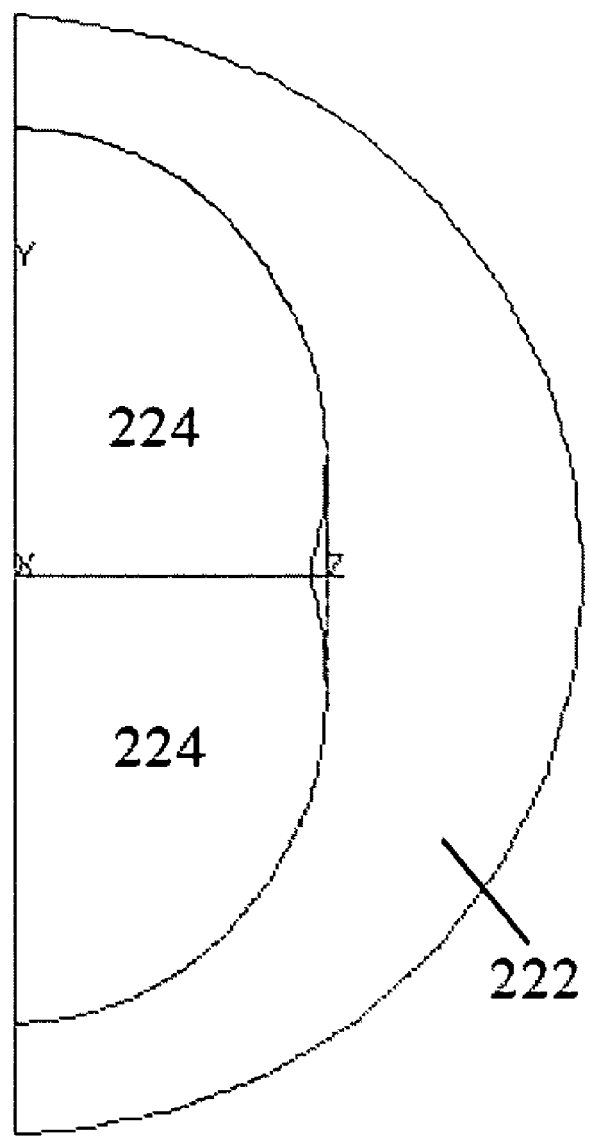
FIG. 12 is a cross-sectional view of FIG. 10 along the section line A-A'.

As an alternative, the ceiling of the light-mixing compartment could be formed with a reflective or partially reflective surface so that optical beams can be reflected by mirror reflection towards the common focus, although at least the central and surrounding portions of the ceiling should remain transparent for forward transmission of light from the third light-emitting source after mixing. Although a light-mixing compartment defined by two collinear intersecting elliptical portion have been described, it would be appreciated that the concave portions need not be elliptical as long as the optical outputs of the peripheral sources can be merged at the central light-emitting source for forward transmission. With a light-mixing compartment defined by a pair of diametrically opposite partial elliptical profiles, the location of the light-emitting sources could be more easily identical for installation purposes. The forward portion of the lens is convex and, more particularly, semi-spherical as shown in FIG. 12. A simple convex surface coupled with a concave light-mixing compartment means the lens can be formed by a single-step molding process which would be highly desirable for low-cost applications.

It will be noted that the concave ceiling of the light-mixing compartment also provides means to increase the exit angle of the optical beam coming from the third light source. In other words, the concave ceiling also serves as a beam diverging lens for the third light-omitting source (and the combined light emission after light has been mixed at the location of the third light-emitting source) from FIGS. 9A-C.

Figure 14:
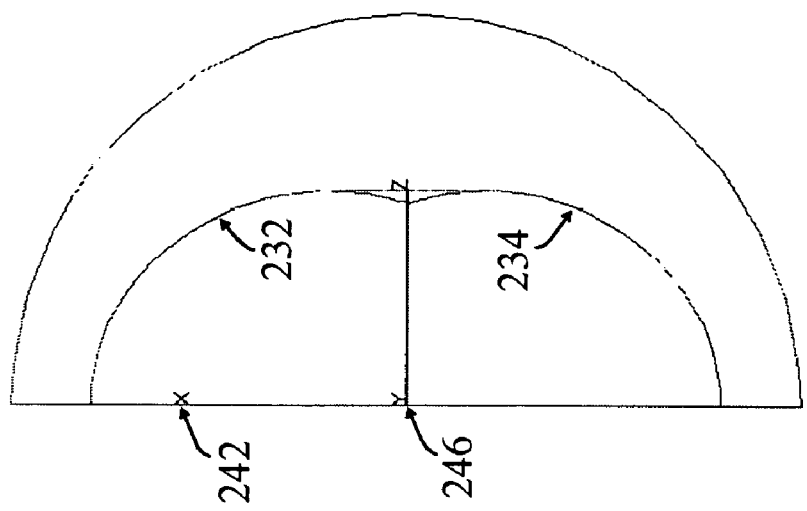
FIG. 14 is a cross-sectional view of FIG. 13 along the section line B-B'.
Figure 13:
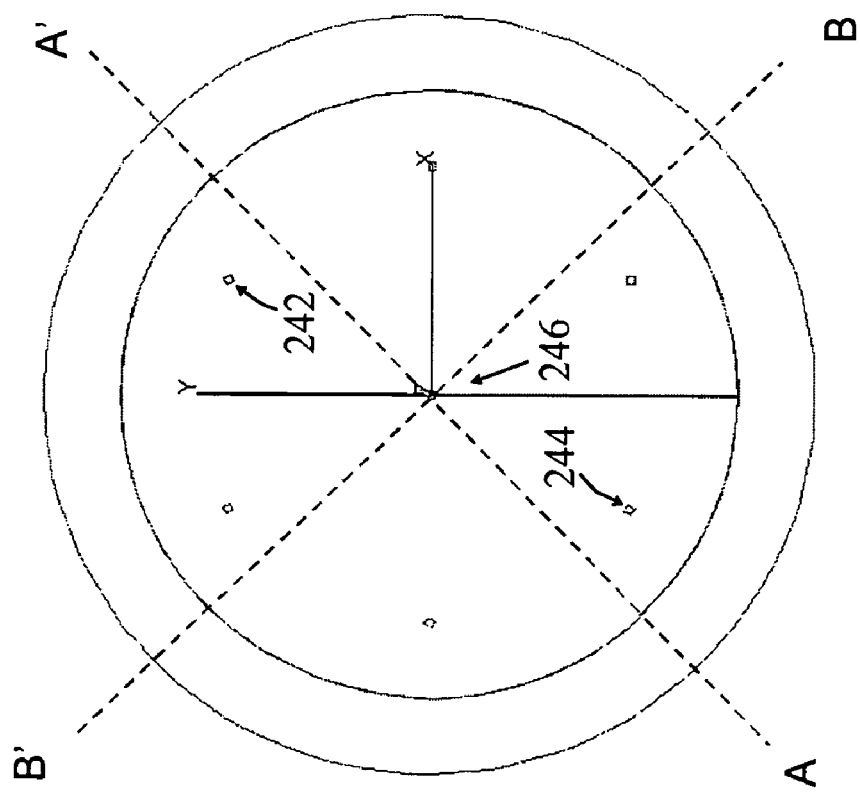
FIG. 13 is a top plane view of the lens of FIG. 10 illustrating positioning of a plurality of peripheral LEDs surrounding a central LED.
Figure 16:
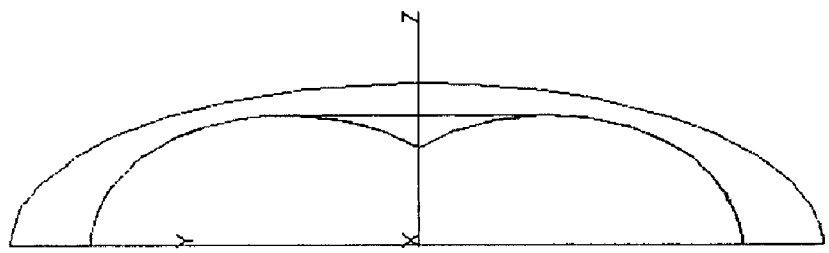
FIG. 16 is a cross-sectional view of an exemplary lens showing a general cross-section of a lens of FIG. 15.
Figure 15:
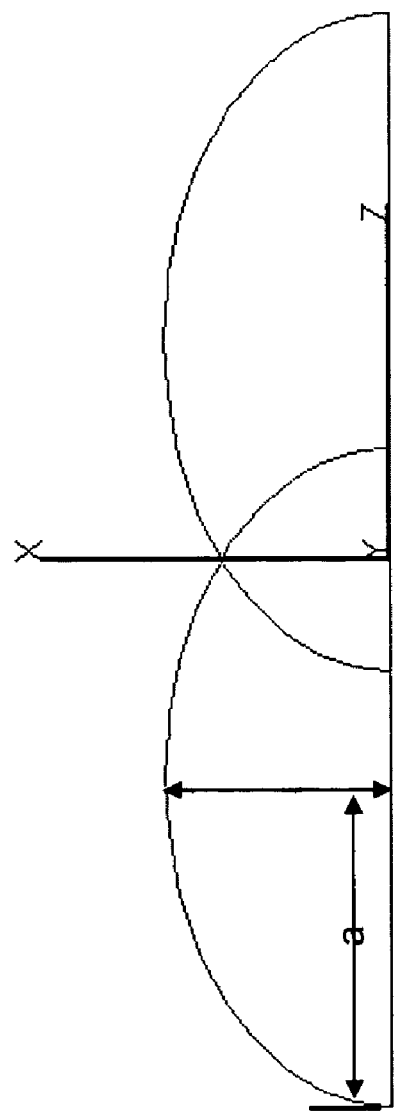
FIG. 15 is a schematic diagram depicting an exemplary internal cross-sectional geometric relationship of a lens of this invention.

Referring to FIGS. 10 to 14, there is shown a lens 220 of a second preferred embodiment of this invention. Similar to the lens of the first embodiment, the lens comprises a lens body 222 with a convex forward portion and a concave light-mixing compartment 224. Instead of being defined by a plurality of discrete intersecting partial ellipsoids, the light-mixing compartment is defined by revolution of a partial ellipse about a central axis, as shown in FIGS. 13 and 14. In this arrangement, the transversal cross-section of the light-mixing compartment across the central axis still comprises a pair of intersecting partial ellipses, although the ellipses 232, 234 are identical. As can be seen in FIG. 13, a plurality of light-emitting sources 242, 244 can be located at any one of the foci of the ellipse on revolution and, by appropriate aligning the individual light-emitting sources, light from the individual peripheral light-emitting sources can be focused at the central (common) foci for light mixing with central LED 246 before forward transmission. Although a pair of identical ellipses has been described in the Figures herein, it should be appreciated that identical ellipses are merely used as a convenient example but not strictly necessary.

In general, the internal geometry of the light-mixing compartment could be described with a ratio between the length of the major axis and the length of the minor axis as a/b and it has been noted that a smaller a/b ratio will give a better mixing effect and a preferred range of a/b is from more than 1 to 1.25.

While the present invention has been explained by reference to the preferred embodiments described above, it will be appreciated that the embodiments are only illustrated as examples to assist understanding of the present invention and are not meant to be restrictive on its scope. More particularly, variations or modifications which are obvious or trivial to persons skilled in the art, as well as improvements made on the basis of the present invention, should be considered as equivalence to the present invention.

Furthermore, while the present invention has been explained by reference to optical assemblies comprising LEDs, it should be appreciated that the invention can apply, whether with or without modifications, to other semiconductor light-emitting sources without loss of generality.

The invention claimed is:

1. A light-emitting assembly comprising a lens, a first optical source, a second optical source and a third optical source, said lens being disposed forward of said first, second and third optical sources, said third optical source being intermediate said first and second optical sources; and said lens and said first, second and third optical sources being arranged so that light emitted from said first and second optical sources merges at said third optical source after undergoing internal reflection at said lens and said light is forwardly transmitted after mixing with light of said third optical source;

said lens comprises a first concave portion and a second concave portion, said first concave portion being configured for reflecting light from said first optical source back towards said third optical source, and said second concave portion being configured for reflecting light from said second optical source back towards said third optical source;

said first concave portion forming part of a first ellipse, and said first and third optical sources being located at the foci of said first ellipse;

said second concave portion forms part of a second ellipse, and said second and third optical sources are located at the foci of said second ellipse;

wherein said first and second ellipses intersect, and said third optical source being located at a common foci of both said first and second ellipses.

2. A light-emitting assembly according to claim 1, wherein said first and second ellipses intersect at a location directly forward of said third optical source.

3. A light-emitting assembly according to claim 1, wherein said first and second ellipses are identical.

4. A light-emitting assembly according to claim 1, wherein the major axes of said first and said second ellipses are collinear, and said first, second and third optical sources are located on the major axes of said first and second ellipses.

5. A light-emitting assembly according to claim 1, wherein said first, second and third optical sources are distributed at foci of said ellipses.

6. A light-emitting assembly according to claim 1, wherein the ratio between the major and the minor axes of each one of said ellipses is larger than 1 and smaller than 1.25.

7. A light-emitting assembly according to claim 1, wherein said first optical source is arranged so that light emitting from said first optical source impinges said lens at an angle exceeding the critical angle and is then reflected towards said third optical source, said second optical source is arranged so that light emitting from said second optical source impinges said lens at an angle exceeding the critical angle and is then reflected towards said third optical source, and said third optical source is arranged for emitting light forward of said lens.

8. A light-emitting assembly according to claim 1, wherein said lens forms a portion of an ellipsoid, and said first, and said second and said third optical sources are distributed on a focal plane, and said focal plane orthogonally intersects the major axis of said ellipsoid and contains foci of said ellipsoid.

9. A light-emitting assembly according to claim 1, wherein said first, said second and said third optical sources are LEDs.

10. A light-emitting assembly according to claim 9, wherein said first, said second and said third optical sources have differing colours to each other.

11. A light-emitting assembly according to claim 10, wherein said first, said second and said third optical sources emit either red light, green light, or blue light.

12. A light-emitting module comprising a plurality of light-emitting assemblies of claim 11 arranged in an array.

13. A light-emitting assembly according to claim 1, wherein said first, second and third optical sources are collinear.

14. A light-emitting assembly according to claim 1, wherein said first, second and third optical sources are equally spaced apart.

15. A lens for conditioning optical output from at least first, second and third light-emitting sources for forward light transmission comprising a first concave portion and a second concave portion, said first concave portion being configured to reflect light emitted by said first light-emitting source towards a third light-emitting source, said second concave portion being configured to reflect light emitted by said second light-emitting source towards said third light-emitting source, and said lens being configured to allow forward passage of light emitted from said third light-emitting source;

said first concave portion forming part of a first ellipse, said second concave portion forming part of a second ellipse, and said first and second ellipses share a common focus; and said first and second concave portions intersect on an intersection plane, and said intersection plane being orthogonal to the major axes of said ellipses and contains a common foci of said first and second ellipses.

16. A lens according to claim 15, wherein the major axes of said first and second ellipses are collinear.

17. A lens according to claim 15, wherein the forward facing portion of said lens is convex.

18. A lens according to claim 15, wherein said first and said second ellipses are identical, and said first and second concave portions of said lens are both formed by revolution of said first or second ellipse about an axis orthogonal to the major axes of said ellipses and intersecting the common focus.

19. A lens according to claim 15, wherein said first concave portion forms part of a hollow ellipsoid and said second concave portion forms part of a second hollow ellipsoid, and said first and second hollow ellipsoids share a common minor axis.

20. A lens according to claim 19, wherein the major axes of said first and second hollow ellipsoids are collinear and said first and second hollow ellipsoids share a common focus.

21. A lens according to claim 19, wherein said first and second hollow ellipsoids are identical.

22. A lens according to claim 15, wherein said first concave portion and said first light-emitting source, and said second concave portion and said second light-emitting source are arranged so that light emitted from said first and said second light-emitting sources is incident upon said first and second concave portions respectively at the critical angle or above, such that light is reflected to said third light-emitting source by total internal reflection.

* * * * *